United States Patent Office 3,535,354
Patented Oct. 20, 1970

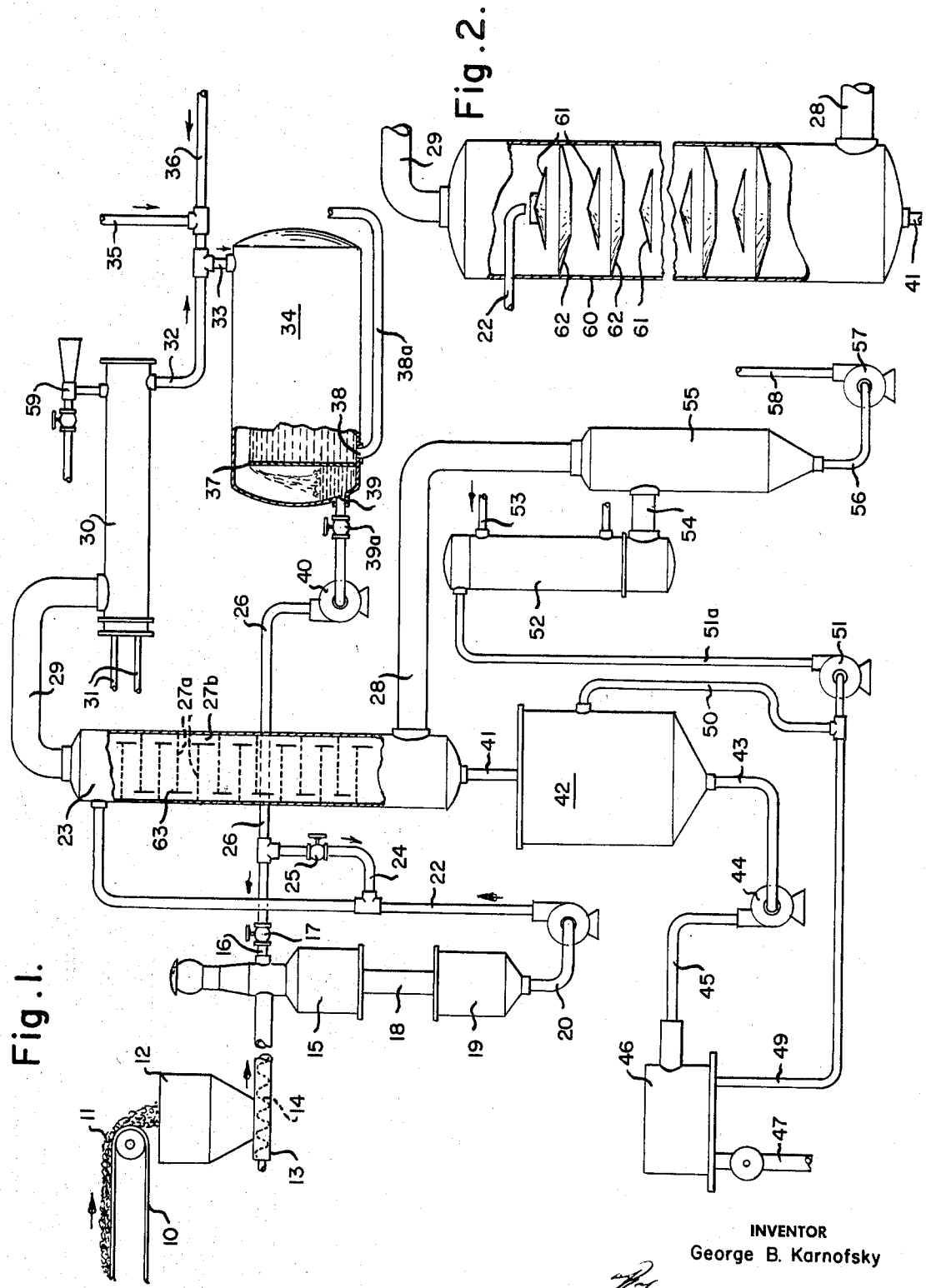

3,535,354
CONTINUOUS SOLVENT EXTRACTION AND DEHYDRATION SYSTEM FOR FAT AND WATER CONTAINING TISSUES
George B. Karnofsky, Mount Lebanon, Pa., assignor to Blaw-Knox Company, Pittsburgh, Pa., a corporation of Delaware
Filed Jan. 10, 1968, Ser. No. 696,870
Int. Cl. C11b 1/10
U.S. Cl. 260—412.8                                4 Claims

ABSTRACT OF THE DISCLOSURE

A new solvent extraction and dehydration system for animal and vegetable tissues containing water and fats (oils and oil soluble substances) by treatment of such tissue with a suitable solvent immiscible with and capable of forming a heterogeneous azeotrope with the water in said tissue and a miscella with the fat and the separate removal of the azeotrope and miscella with the employment of solvent in vapor form as a heating medium.

---

This invention relates to a new solvent extraction and dehydration system for animal and vegetable tissues containing water and fats including oils and oil-soluble substances. More particularly, the new system pertains to the treatment of such tissues with a suitable solvent immiscible with and capable of forming a heterogeneous azeotrope with the water in said tissues and a miscella with the fat in said tissues, and the separate removal of the azeotrope and the miscella with the employment of solvent in vapor form as a heating medium.

By the term fat as used herein, there is comprehended fats, oils, and oil-soluble substances. The term miscella is herein used in the usual sense of the art of solvent extraction of fats and oils, to mean a solution of such fat in the solvent.

The advantages of the new system are that it avoids cyclic or batch type of operations with their interrupted production and relatively more expensive handling charges. It provides an effective removal of water and of fat (including oil and oil-soluble substances) from the tissues by the new operation to an extent which may eliminate after-treatment such as the further extraction of fats from the solids which is required in some conventional operations. Still further, in the new system, the very act of providing a heating medium for the vaporizing of the azeotrope may also be employed to concentrate the miscella from the new operation. Under the new system, also, the apparatus in functioning in the continuous manner remains relatively clean and free from the fouling with solids that occurs in other practices.

Other objects and advantages will be apparent from the following description and from the drawings, which are schematic only, in which:

FIG. 1 illustrates one embodiment for a practice of the new system; and

FIG. 2 illustrates one alternate construction for the tower 23 shown in FIG. 1.

Referring to the embodiment illustrated in FIG. 1, an endless conveyor belt 10 may be used to transport fat and water-containing tissue such as fish offal or meat scrap 11 to a hopper 12. The bottom of hopper 12 may open into a conveyor tube 13 in which an endless screw 14 is rotated to progress the solids tissue 11 in the direction of the arrow and empty it into a disintegrator 15. Liquid solvent may also be supplied, if desired, to disintegrator 15 through a pipe 16 in which an automatic or manual proportioning valve 17 may be placed. Such a disintegrator 15 will comminute and disintegrate the tissue to form with any liquid solvent entering through pipe 16 a slurry which will flow out through a pipe 18 into a slurry tank 19 connected to the lower end of pipe 18. A pipe 20 is connected to pump 21 to pump the contents of tank 19 through a feed pipe 22 into a contact tower 23 adjacent the upper part thereof.

A branch pipe 24 connects pipes 16 and 22. A valve 25 is placed in pipe 24 and the respective settings of valves 17 and 25 determine the division of liquid issuing from pipe 26 as to the proportion which flows into disintegrator 15 and the proportion that flows directly into pipe 22. By suitably proportioning the liquid flow, the tissue can be ground in the optimum amount of solvent. Tissue 11 is ground sufficiently fine in disintegrator 15 to make the fat content available for extraction by the solvent and to make the water content available for azeotropic dehydration.

The liquid and pulped tissue slurry entering the tower 23 through pipe 22 flows transversely across a series of conventional sieve plates 27a and downwardly through downcomers 27b from plate to plate, thus distributing and redistributing the liquid and tissue slurry while maintaining contact between the slurry and the heating vapors passing upwardly through the perforations of the sieve plates 27a from bottom to top of the contactor tower 23. The depth of slurry on each plate 27a, fixed by the height of the overflow weirs 63, is made sufficient to provide the retention time that is required for removing water from the tissue 11, especially at the bottom of the tower where the last bound moisture is removed. Any suitable alternative structure for extending the surface of the slurry in contact with vapors, and distributing and redistributing the liquid-like slurry and heating vapors, and providing adequate retention time, may be used instead of the sieve-plate type of tower. Packed columns or contactors with trays having conventional bubble caps, however, should be avoided as these may tend to become fouled by the solid materials in the slurry. One such alternative structure is a tower 60 as shown in FIG. 2, in which the sieve plates are replaced by alternate disc and donut baffles 61 and 62.

The heating vapors are initially solvent vapor introduced into tower 23 adjacent the lower portion thereof through a vapor inlet pipe 28. In the course of its flow upwardly through tower 23 countercurrent to the downward movement of the solids and liquids therein, the heating vapors give up heat to, and cause the vaporization of water from the mixture of liquid solvent and wet solids on the sieve plates. Such vaporization effectively dehydrates the tissues 11. The water vapor evolved, mixed with solvent vapor in substantially azeotropic proportions, passes out of tower 23 through a vapor outlet pipe 29 connected thereto. In providing heat for the vaporization; substantial quantities of the solvent vapors issuing from pipe 28 into tower 23 are condensed and enter the slurry as liquid solvent, replacing the water evaporated, in the ratio of 6 to 10 lbs. of solvent per pound of water, depending on the solvent. The contact in tower 23 between solids and solvent dissolves fat from the tissues 11 to form dilute miscella at the base of the tower.

The vapors of solvent and water passing through pipe 29 flow into condenser 30, which may be of shell and tube type, supplied with a cooling medium flowing through the pipes 31. An ejector 59 may be provided to eliminate non-condensibles by venting them to atmosphere and, when desired, to provide vacuum for operation at subatmospheric pressure. In condenser 30, the vapors discharged from pipe 29 are condensed and leave condenser 30 through a pipe 32 whence they flow through a pipe 33 into a separating tank 34. Water and solvent from solvent recovery operations of conventional nature which form no part of the instant invention may also pass into tank 34 through pipes 35 and 36. Thus, pipe 35 may be connected to bring solvent recovered in conventional desolventizing to remove residual liquid solvent from the solids and pipe 36 may return solvent recovered from miscella strippers used in conventional fat desolventizing practice.

The separating tank 34 is of known and conventional construction. It may contain a baffle 37 extending upwardly from the bottom near one end, the feed pipe 33 and an outlet 38 for the heavier liquid being on the same side of the baffle while the outlet 39 for the lighter liquid separating as the upper liquid layer and overflowing the top of baffle 37, is on the opposite side. In FIG. 1, I illustrate the connections applicable when the solvent is a liquid lighter than water (such as octane), which is withdrawn from opening 39 through valve 39a by the pump 40, while the water discharged through 38 may be sent to waste through a pipe 38a. Solvent is delivered by pump 40 into the pipe 26. When a solvent heavier than water, such as trichloroethylene, is used, the suction side of pump 40 is connected to outlet 38 of separator 34 since water in that case would be discharged over baffle 37 and through outlet 39 to waste. Other means for separating immiscible liquids, such as a centrifuge, for example, may also be used in my system as equivalent to the decanter type of separator 34 illustrated in the drawing.

The dehydrated solids from tissue 11 and the miscella reaching the bottom of tower 23 are discharged together through a solids and liquid pipe 41 connected to the bottom of tower 23. The other end of pipe 41 may be connected to and discharged into a separating vessel 42. As shown, vessel 42 is a thickener decanter which produces a clear miscella at the top and a thickened slurry at the bottom joined by a zone of intermediate separation in which the solids vary from a relatively low concentratiton at the top of the zone to a high concentration at the bottom. The tissue solids in the lower part of vessel 42 may be in the form of a sludge which flows out through a pipe 43, the other end of which may be connected to a pump 44 to pump the tissue solids through a pipe 45 into a centrifuge 46 of a conventional nature. In centrifuge 46, a further separation between the tissue solids and residual miscella is made, the solids passing out of centrifuge 46 through a pipe 47 and the residual miscella leaving centrifuge 46 through a pipe 49. It will be understood that the vessel 42 and the pump 44 may be omitted by making the entire separation of solids from miscella in the centrifuge 46. If the solids and miscella have the same general density and cannot be separated on the basis of different densities, a conventional filter or perforated bowl centrifuge would be used for solids liquid separation. The solids passing through pipe 47 will generally then be desolventized in a manner known which will be understood by those in the art, the recovered solvent as aforesaid being returned through a pipe 35.

Dilute miscella flowing through pipe 49 joins dilute miscella from vessel 42 flowing through pipe 50, at the suction side of a pump 51 and the combined streams flow through a pipe 51a into a shell and tube evaporator 52. In evaporator 52 a condensing fluid like steam entering through the pipe 53 is circulated in the spaces between the tubes within the evaporator 52. The miscella from pipes 49 and 50 flows, in the embodiment illustrated, downwardly through those tubes and in the course of that passage, solvent in the miscella is evaporated. The effluent from the tube side of evaporator 52, which is discharged through duct 54, comprises concentrated miscella in liquid form and solvent vapor.

Duct 54 discharges into a separating vessel 55 in which the concentrated miscella is separated from the solvent vapors, which vapors leave the upper portion of separator 55 through the pipe 28. Concentrated miscella leaves separator 55 through a pipe 56 connected to the bottom thereof. A pump 57 delivers the concentrated miscella through a pipe 58 to a miscella clarifying and stripping assembly (not shown) as will be understood by those skilled in the art, for recovery of solvent-free fat. Solvent recovered from such a miscella clarifying and stripping operation subsequent to its discharge from vessel 55 is conducted back as described through pipe 36.

By way of example illustrating advantages of the new system, but without limitation thereto, I describe the application of my system to dehydration and extraction of fish offal or whole fish using commercial octane as the solvent at an absolute pressure of about 200 millimeters of mercury, maintained by the ejector 59. Fish offal varies in composition. It may, on a weight basis, contain about 75% water, 10% fat, and 15% protein-containing solids. Octane has a specific gravity less than that of water with which it forms a heterogeneous azeotrope boiling at about 193° F. at atmospheric pressure, and boiling at about 135° F. at the operating pressure of 200 mm. Hg absolute used in this example within tower 23, evaporator 52 and separator 55.

Given a raw feed of fish offal having a composition such as specified, the slurry produced by disintegrator 15 may be sufficiently fluid, due to the high water content, that dilution with solvent is unnecessary and valve 17 may be closed, all added liquid octane being introduced through valve 25 in such case. The octane cycling to the process through line 26 is the sum of the octane in the vapor in line 29, in the solids in line 47 and in the residual miscella in line 58. For a capacity of 1000 lb./hr. of such fish offal the contacting tower 23 may be about two feet in internal diameter and twenty-five feet high, fitted with about ten sieve plates 27. The azeotropic vapors in 23 will amount to about 3,560 pounds per hour having a weight proportion of water vapor to solvent vapor therein of about one to four.

To supply solvent vapor for dehydration, about 7,400 pounds per hour of octane vapor per hour at about 185° F. and about 200 mm. Hg absolute must be generated in the evaporator 52 and delivered to the base of the contact tower 23 through the vapor pipe 28. The slurry at the bottom of the contactor tower, flowing out through the pipe 41, has a temperature above 135° F. (the azeotropic boiling temperature) and comprises dehydrated protein solid particles and miscella containing 1.3% fat by weight. That miscella, after separation in vessel 42 and centrifuge 46 is partially desolventized in the evaporator 52 to yield the 7,400 pounds per hours of octane vapor as above specified, and to concentrate the miscella to about 20% oil by weight.

As a second example, but without limitation thereto, I describe the dehydration and extraction of meat scrap using trichlorethylene as the solvent at atmospheric pressure. A typical meat scrap may contain 35% water, 37% fat, and 28% dry cracklings. The azeotrope of trichlorethylene and water boils at 164° F. at atmospheric pressure. Liquid water and trichlorethylene are readily separated by gravity, water being the lighter liquid of the two.

Given a raw feed of such typical meat scrap of about 1000 pounds per hour, such would be ground in the disintegrator 15 admitting sufficient liquid solvent through valve 17 to make a fluid slurry. At the top of the tower, about 4,610 pounds of water and solvent vapor of azeotropic composition pass through pipe 29 to the condenser 30, the condensed liquids being separated in the separator 34. Since the solvent is the heavier liquid in this case, the intake of pump 40 would be connected to outlet 38 instead of to outlet 39 as described above. A slurry of miscella and cracklings is withdrawn through pipe 41 for separation of the liquid miscella and solids. In this case, the miscella and cracklings do not differ greatly in specific gravity and the separator will take the form of a continuous filter rather than a settling tank like separator 42 or a centrifuge. The separated miscella contains about 4% fat by weight, and is concentrated to about 27% fat in the evaporator 52 where about 7,300 pounds per hour of trichlorethylene vapor at 200° F. is generated and passes into the base of the tower 23 through the pipe 28.

It will be seen that in the preferred practice of my new system the only heating medium in tower 23 is solvent vapor supplied it. Part of this vapor condenses in the tower to supply the heat required for removal of water as an azeotropic mixture of water and solvent vapors. The heat for vaporization of the water in the feed solid is supplied without any deleterious contact between the solids and heat transfer surfaces, and with the condensation of a maximum of solvent to form miscella with the fat. Consequently, miscella discharged with the spent solids through pipe 41 is so dilute that the solids in equilibrium with the miscella are substantially extracted; and no subsequent operation for the extraction of residual oil is needed. Countercurrent flow of solids and solvent vapor assures that the water content of the vapor leaving the top of tower 23 is at or near the maximum corresponding to the azeotropic composition; and assures also that the solids leave the tower in contact with essentially water free solvent vapor as is required for effective removal of water from nearly dehydrated solids. Temperature for water removal in the tower is reduced by the partial pressure exerted by the solvent, and may be additionally reduced as desired by application of vacuum, to produce dehydrated solids whose protein is undamaged by excessive temperature.

Although the examples have chiefly referred to the treatment of fish offal, whole fish, and meat scrap, and particularly to the production of edible products from them, the new system is equally applicable to other high water-content animal and vegetable organic solids having fat, oil and oil-soluble substances therein. Various other modifications may be made in the new system and various other embodiments provided for the practice thereof without departing from the spirit of this invention or the scope of the appended claims.

I claim:

1. A continuous process for solvent extraction and dehydration of fat-and-water containing animal and vegetable organic solids comprising comminuting said solids, contacting the comminuted solids with vapor of a solvent for fat immiscible with and capable of forming an azeotrope with water, the heat derived from condensation of said solvent vapor being the sole source of applied heat in said contacting, said solvent vapor being supplied in amount sufficient to remove water from said solids as the heterogeneous azeotrope of water and said solvent and to substantially dehydrate said solids, the condensation of solvent vapor providing liquid solvent flowing concurrently with said solids.

2. The process of claim 1 characterized by said vapor and said comminuted solids flowing countercurrently during said contacting step, removing a mixture of dehydrated comminuted solids and fat-solvent miscella at the completion of the contacting step, separating said miscella from said solids, evaporating solvent from miscella and returning the solvent vapor thus evaporated to said contacting step.

3. The process of claim 1 characterized by comminuting said solids in the presence of liquid solvent, said liquid solvent and additional liquid solvent as condensed in said means for contacting flowing concurrently with said solids through said means for contacting and being withdrawn with the miscella therefrom, and passing said solvent vapor through said means for contacting countercurrent to said solids and miscella.

4. A continuous process for solvent extraction and dehydration of fat-and-water containing animal and vegetable organic solids comprising comminuting said solids, passing the condensable vapor of a solvent for fat immiscible with and capable of forming an azeotrope with water in countercurrent contacting relation with said solids to condense part of said vapor in liquid form and evaporate water from said solids as the heterogeneous azeotrope of water and said solvent, the said solvent being immiscible with water, the said condensing of part of said vapor providing the sole source of heat applied in said contacting relation, said solvent vapor being supplied at a rate sufficient to substantially dehydrate said solids prior to termination of said contacting relation, the said condensing of solvent vapor providing liquid solvent flowing concurrently with said solid and extracting fat therefrom to form a miscella of fat and solvent.

References Cited

UNITED STATES PATENTS

| 2,665,198 | 1/1954 | Harcourt | 260—412.8 |
| 2,680,754 | 6/1954 | Stapelberg | 260—412.8 |
| 2,686,192 | 8/1954 | Bonotto | 260—412.8 |
| 3,064,018 | 11/1962 | Bruera | 260—412.8 |

LEWIS GOTTS, Primary Examiner

J. R. BROWN, Assistant Examiner

U.S. Cl. X.R.

23—267; 202—169